United States Patent

Vuorinen

[11] Patent Number: 5,125,584
[45] Date of Patent: Jun. 30, 1992

[54] METHOD AND APPARATUS FOR REMOVING IMPURITIES FROM PAPER PULP IN PULPERS

[75] Inventor: Timo Vuorinen, Tampere, Finland
[73] Assignee: Oy Tampella Ab, Tampere, Finland
[21] Appl. No.: 570,373
[22] Filed: Aug. 21, 1990

[30] Foreign Application Priority Data

Aug. 21, 1989 [FI] Finland .................................. 893913

[51] Int. Cl.⁵ .............................................. B02C 23/38
[52] U.S. Cl. .................................. 241/46.17; 241/69; 241/152.1
[58] Field of Search ............. 162/4, 261; 241/46.17, 241/69, 152 R

[56] References Cited

U.S. PATENT DOCUMENTS

| | | | |
|---|---|---|---|
| 2,679,982 | 6/1954 | Thyle | 241/46.17 |
| 3,713,594 | 1/1973 | Blakley et al. | 241/46.17 X |
| 3,877,648 | 4/1975 | Vokes | 241/46.17 X |
| 4,369,093 | 1/1983 | Lamort | 162/261 X |
| 4,592,513 | 6/1986 | Musselmann et al. | 241/46.17 X |
| 4,941,970 | 7/1990 | Ahs | 241/46.17 X |

FOREIGN PATENT DOCUMENTS 0279022 10/1987 European Pat. Off. .
3639200 5/1988 Fed. Rep. of Germany .
74496 10/1987 Finland .

*Primary Examiner*—Mark Rosenbaum
*Attorney, Agent, or Firm*—Pollock, Vande Sande & Priddy

[57] ABSTRACT

In a method and apparatus for removing impurities from paper pulp, the pulping space enclosed by a solid jacket is divided into a primary and a secondary space by means of a partition wall. Both the primary and the secondary space are provided with separate rotor units and perforated screen plates in connection with rotor units. The paper pulp to be purified is conducted into the primary space and a connection between the primary and secondary spaces is arranged within the partition wall which allows for continuous use of both spaces for removing impurities.

7 Claims, 2 Drawing Sheets

METHOD AND APPARATUS FOR REMOVING IMPURITIES FROM PAPER PULP IN PULPERS

FIELD OF THE INVENTION

The present invention relates to a method for removing impurities from paper pulp in pulpers having the pulping space, whereto the paper pulp to be purified is conducted, provided with a rotor unit or corresponding and a screenplate in connection therewith.

BACKGROUND OF THE INVENTION

Methods and apparatuses of prior art are described for instance in publications FI-74496, DE-3 639 200 and EP-279 022. The methods and apparatuses presented in these publications include a separate wash space which is in connection with the pulping space and which is relatively small in volume compared to that of the pulping space. Therefore, these known methods and apparatuses require the use of separate attachments for connection to the actual pulping space. Handling of the rejected portion is particularly difficult and application of the methods requires a substantial amount of wash water. The capacity of the known methods is low and some of them involve batch operation.

SUMMARY OF THE INVENTION

The object of this invention is to present a method by which it is possible, while maintaining an undisturbed operation, to remove especially the very light impurities from paper pulp in the most efficient way and at the same time keep fiber losses low so that the removing capacity of the impurities remains high.

In order to attain these objects the method according to the invention is mainly characterized in that the pulping space enclosed by a solid jacket is divided into a primary and a secondary space by means of a partition wall both the primary and the secondary space are provided with separate rotor units or corresponding and perforated screenplates or corresponding in connection with the rotor units, the paper pulp to be purified is conducted into the primary space and a connection between the primary and secondary spaces is arranged within the partition wall The benefits attainable by the method according to the invention are listed in the following The method can be applied in connection with either a completely new pulper construction or one already in operation, the method in the latter case having no detrimental influence on the pulping time, the pulper applying the method has high capacity and its volume can be dimensioned according to the needs of purification, the pulper applying the method can be designed to have such a form that it efficiently prevents the large heavy impurities from entering the screenplate in the secondary space and efficiently collects the light impurities, by means of the pulper utilizing the method it is possible to increase the bale submerging efficiency, pulping efficiency increases since there are provided two rotor units in the pulping space and then the power consumption per unit mass of paper pulp to be screened is decreased compared to known solutions, the pulper applying the method can be easily designed to have such a form that the outcoming accepted portions can be jointly conducted forwards to the following processing stage and so there is no need for recycling which decreases the capacity, since the total area of the screening surfaces or corresponding can be made large it is possible to use a smaller hole size and thereby achieve a purer paper pulp to be conducted forward for the next processing stage, expensive and large automatic valves are not needed in the present method making the process control cheaper and simpler, removal of the accepted portion from the secondary space can be done either periodically or continuously, for example, by means of a screw conveyor, in the present method, the outlet consistency of the rejected portion removed from the secondary space can exceed 20% so that the subsequent processing of the rejected portion or removal from the pulping process for instance for use in ballasting or in combustion can be simply realized, for example, by means of belt conveyors; it is possible to wash the rejected portion in the screw conveyor permitting complete collection of fibers using small amounts of water; and the accepted portion filtered in the screw conveyor can be conducted to the main pump and forwards in the process, application of the method does not disturb the automation of the rotor unit functioning as the actual pulper in the primary space and does not produce any major consistency variations to the main pump, applying of the method and in particular the design of the apparatus allows conduction of a major part of the paper pulp through the secondary space, if necessary, when the method is applied impurities will be conducted into the secondary space thus making it unnecessary to stop the rotor unit for cleaning the screenplate in the primary space, which functions as the actual pulping space.

The invention also relates to an apparatus for application of the method.

The invention is more closely illustrated in the following description referring to the embodiment of the enclosed drawings. In the drawings:

BRIEF DESCRIPTION OF THE DRAWINGS

As shown in FIGS. 1-3, a pulping space 2 is enclosed by a solid jacket 1. As seen particularly in FIG. 3, the jacket 1 of the pulping space 2 is essentially spherical in the horizontal cross-section. Furthermore, the vertically disposed cylindrical jacket 1 contains an upper end portion 3 on one hand and on the other hand a lower end portion 4, which in the horizontal direction essentially restricts the pulping space 2.

Figure 1:
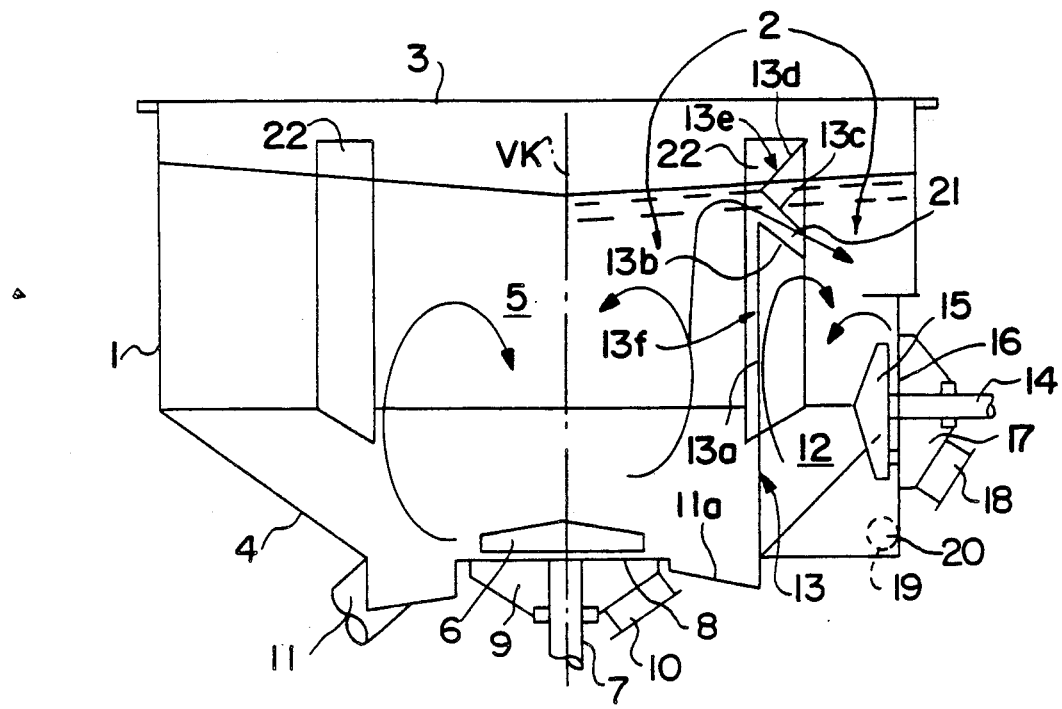
FIGS. 1 and 2 show a pulper used in the method according to the invention in a vertical cross-section and FIG. 3 shows the pulper of FIGS. 1 and 2 in a horizontal cross-section as seen from above.

The paper pulp to be purified is introduced into the pulping space 2 from the side of the upper end portion 3 (not shown) into the primary space 5 accommodating a horizontally rotating rotor unit 6 positioned in the lower end portion 4. The rotor unit 6 has a vertical drive shaft 7, which is parallel with the center line VK of the jacket, is arranged to rotate round center line VK and passes through the lower end portion 4. Under the rotor unit 6 there is provided a perforated horizontal screenplate 8 through which there is a connection from the primary space 5 into an outlet chamber 9 for the accepted portion of the pulp below the rotor unit 6 and the screenplate 8, the outlet chamber 9 having an accepted pulp outlet connection 10. Furthermore, in connection with the lower end portion 4 there is provided essentially an annular groove 11a surrounding the rotor unit having at its lowest portion an outlet connection 11 for the rejected portion. The pulping space 2 is also provided with a secondary space 12 by means of a vertical partition wall 13 dividing the pulping space 2. The secondary space 12 accommodates a corresponding rotor unit 15 arranged to rotate in a vertical plane round a horizontal shaft 14. The jacket 1 has in the proximity of the rotor unit 15 a perforated vertical screenplate 16 through which there is provided a connection from the secondary space 12 via the rotor unit 15 into the outlet chamber 17 for the accepted portion of the secondary space 12, the outlet chamber 17 having an accepted portion outlet connection 18. There is also an outlet connection 19 for the rejected portion in the lower part of the secondary space 12. There is also provided a screw conveyor 20 or corresponding mounted in contact with the outlet connection 19 of the secondary space 12 for removing the rejected portion from the secondary space.

Figure 2:
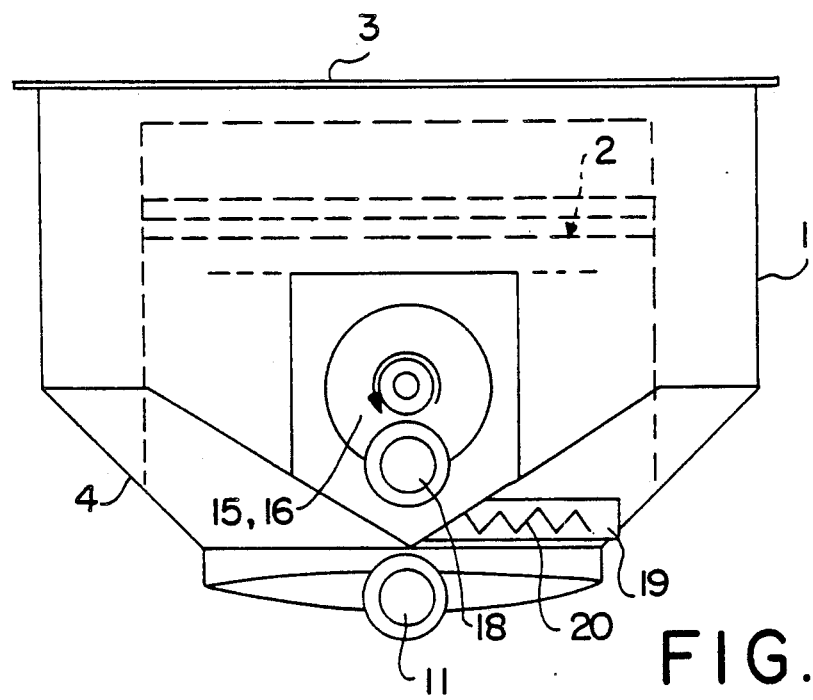
Figure 3:
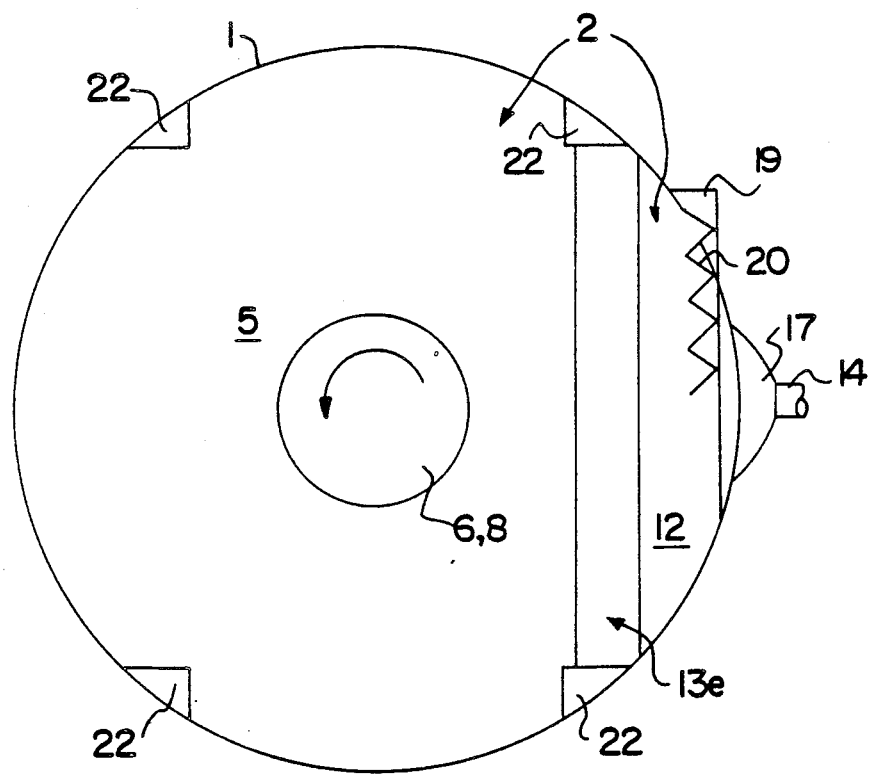

As can be noted in FIGS. 1-3 the primary space 5 is larger in volume than the secondary space 12 this being due to the disposition of the partition wall 13. In the horizontal cross-section, the partition wall divides the upper cross-section of pulping space 2 (FIG. 3) into two segments, the larger one constituting the primary space 5 and the smaller one the secondary space 12.

The partition wall 13 can have a plate structure being attached by its vertical sides to the inner walls of the pulping space 2. The plate structure can be partly or wholly perforated and then there will be flow of the paper pulp to be purified through the perforations from the primary space 5 into the secondary space 12. Furthermore, the upper part of the partition wall 13 in the proximity to the surface of the paper pulp, may have an essentially horizontal and downwards to the secondary space directing flow canal 21, as illustrated particularly in FIG. 1, especially for conducting the lighter impurities into the secondary space 12. The flow canal 21 is formed by means of a plate 13b, being disposed on the upper edge of the vertical plate 13a of the lower part 13f of the partition wall 13 and being directed obliquely downwards from said upper edge towards the secondary space 12, and the lower guide plate 13c of the upper part 13e of the partition wall structure 13, being disposed over the plate 13b and being situated at a distance therefrom. The lower guide plate 13c, which is essentially parallel with the plate 13b in the vertical cross-section (FIG. 1), is joined within its horizontal edge facing the primary space 5 to the plate 13d, being directed obliquely upwards away from the primary space 5, the plate 13d thus forming the upper part 13e of the partition wall structure 13 together with the plate 13c. The upper edge of the partition wall 13 therefore is located below the inner surface of the upper end portion 3 at a distance therefrom.

As can be noted particularly in FIGS. 1 and 3, the inner surfaces of the jacket 1 in the pulping space 2 are equipped with essentially vertical flow guide vanes 22 (four of them at a specific distance).

The embodiment of the apparatus shown in FIGS. 1-3 functions in the following way: paper pulp is supplied, for example, in bales into the primary space 5 where the bales are breaking down and simultaneously mixing with water, which is supplied into the primary space 5 (not shown) and, into the primary space 5, getting into a rotary motion created by the rotor unit 6 and the accepted portion moving via the blades of the rotor unit 6 from the screenplate 8 through the perforation into the outlet chamber 9 for the accepted portion and therefrom to the outlet connection 10 which is connected to, for example, a pulp vat whereto the pulp is pumped by means of a pump attached to a pipe in the outlet connection 10. The rejected portion, draining away through the outlet connection 11 of the primary space 5, is treated after the outlet connection by means of high pressure water in order to return the possible usable fibers in the rejected portion into recycling. The paper pulp going into the secondary space 12 through the partition wall 13 is driven into rotary motion by the rotor unit 15 in the secondary space and via the blades of the rotor unit 15 the accepted portion goes through the perforation of the screenplate 16 into the outlet chamber 17 for the acception portion and further into a pipe connected to the accepts outlet connection 18 wherefrom it is conducted using the pump further into a pulp vat. In the processing of the rejected portion, which has been removed from the bottom of the secondary space by means of a screw conveyor or corresponding, high pressure water is used for separating the possible still usable fibers in the rejected portion.

I claim:

1. A pulper apparatus for removing impurities from a paper pulp, said apparatus comprising:
   1) a pulping space enclosed by a solid jacket, said pulping space being divided into a primary and a secondary space by a partition wall;
   2) a rotor unit and a screen plate operatively connected with said rotor unit, said rotor unit and said screen plate being provided in said primary and said secondary space respectively;
   3) outlet connections for the accepted and the rejected portion of the paper pulp, communicating with said primary and secondary spaces;
   4) inlet means in said housing communicating with said primary space for introducing the paper pulp to be purified; and
   5) means for providing paper pulp flow connection between the primary and secondary spaces through said partition wall;
   wherein said partition wall, as seen in the horizontal cross-section of the jacket, is arranged to divide the pulping space, being essentially spherical in cross-section, into two segments forming said primary and secondary space.

2. An apparatus according to claim 1 wherein at least part of said partition wall is provided with perforations and is therefore made paper pulp penetrable.

3. An apparatus according to claim 1 wherein an upper portion of said partition wall is provided with said means for providing paper pulp flow connection between said primary space and said secondary space.

4. An apparatus according to claim 1 wherein said means for providing paper pulp flow connection in said partition wall includes a horizontal flow channel, and wherein said partition wall is divided into two parts, with said flow channel being disposed between them.

5. An apparatus according to claim 1 wherein said partition wall divides the pulping space such that the primary space is larger than the secondary space.

6. An apparatus for removing impurities from a paper pulp comprising:

1) an integral pulping space enclosed by a single housing member, said integral pulping space being divided into a primary and a secondary space by a partition wall;
2) a rotor unit and a screen plate in operating connection with said rotor unit said rotor and said screen plate being provided in said primary and in said secondary space respectively;
3) outlet means for the accepted and the rejected portion of the paper pulp said outlet means being in communication with said primary and secondary spaces;
4) inlet means communicating with said primary space for introducing thereto the paper pulp to be purified;
5) flow connection means provided in said partition wall for continuous flow of the paper pulp between the primary and secondary spaces to allow continuous use of said two spaces is the operation of removal of the impurities from the paper pulp.

7. An apparatus according to claim 6 wherein said flow connection means is defined by a plurality of performations provided in said partition wall.

* * * * *